(12) United States Patent
Fenney et al.

(10) Patent No.: US 7,834,872 B2
(45) Date of Patent: Nov. 16, 2010

(54) TILING SYSTEM FOR 3D RENDERED GRAPHICS

(75) Inventors: Simon Fenney, Hertfordshire (GB); Xile Yang, Hertfordshire (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 0 days.

(21) Appl. No.: 10/811,071

(22) Filed: Mar. 26, 2004

(65) Prior Publication Data

US 2004/0246251 A1  Dec. 9, 2004

(30) Foreign Application Priority Data

Mar. 27, 2003 (GB) ................... 0307095.0

(51) Int. Cl.
*G06T 15/40* (2006.01)
*G06T 15/00* (2006.01)

(52) U.S. Cl. ........................ 345/421; 345/419
(58) Field of Classification Search ........................ None
See application file for complete search history.

(56) References Cited

U.S. PATENT DOCUMENTS

| | | | | |
|---|---|---|---|---|
| 5,265,210 A * | 11/1993 | Vatti et al. | ................... | 345/443 |
| 5,668,940 A * | 9/1997 | Steiner et al. | ................ | 345/592 |
| 5,729,672 A | 3/1998 | Ashton | | |
| 5,809,219 A * | 9/1998 | Pearce et al. | ................. | 345/426 |
| 6,099,573 A * | 8/2000 | Xavier | ............................ | 703/7 |
| 6,259,452 B1 * | 7/2001 | Coorg et al. | ................ | 345/421 |
| 6,326,964 B1 * | 12/2001 | Snyder et al. | ................ | 345/419 |
| 6,437,780 B1 | 8/2002 | Baltaretu et al. | | |

(Continued)

FOREIGN PATENT DOCUMENTS

GB  2 251 770 A  7/1992

(Continued)

OTHER PUBLICATIONS

International Search Report mailed Oct. 6, 2004 in PCT International Application No. PCT/GB2004/001076 (4 pages).

(Continued)

*Primary Examiner*—Daniel F Hajnik
(74) *Attorney, Agent, or Firm*—Flynn, Thiel, Boutell & Tanis, P.C.

(57) ABSTRACT

A method and an apparatus for shading three-dimensional computer graphic images is provided. A display on which the image is to be viewed is subdivided into a plurality of rectangular areas. For each rectangular area, a list of objects in the image which may be visible is determined, and this list is used to determine how the rectangular area should be shaded for display. In deriving the list of objects, a determination of maximum and minimum values for each object in x and y directions is used, and a set of sampling points is determined from these values. If a bounding box surrounding the object covers any of the sampling points, the object is added to the object list or otherwise rejected. Also provided is a method and an apparatus for testing an edge information for each object against the sample points to determine whether or not the object falls into the rectangular area in the bounding box surrounding the object. The step of testing the edge information includes shifting the edge information by a predetermined amount based on the orientation of each edge.

6 Claims, 5 Drawing Sheets

U.S. PATENT DOCUMENTS

| | | | |
|---|---|---|---|
| 6,624,823 B2 * | 9/2003 | Deering ........................ | 345/613 |
| 6,646,639 B1 * | 11/2003 | Greene et al. ................ | 345/422 |
| 6,798,410 B1 * | 9/2004 | Redshaw et al. ............. | 345/427 |
| 2002/0039100 A1 | 4/2002 | Morphet | |
| 2002/0050990 A1 * | 5/2002 | Sowizral et al. ............. | 345/421 |
| 2002/0180729 A1 * | 12/2002 | Venkataraman et al. ..... | 345/420 |
| 2003/0122815 A1 | 7/2003 | Deering | |
| 2003/0122819 A1 | 7/2003 | Koneru et al. | |
| 2003/0122829 A1 * | 7/2003 | McNamara et al. .......... | 345/441 |

FOREIGN PATENT DOCUMENTS

| | | |
|---|---|---|
| GB | 2 298 111 | 8/1996 |
| GB | 2 343 603 | 5/2000 |
| GB | 2 343 603 A | 5/2000 |
| WO | WO 01/95257 | 12/2001 |

OTHER PUBLICATIONS

Search Report dated Sep. 2, 2004 in United Kingdom Application No. 0407045.4 (5 pages).

\* cited by examiner

TILING SYSTEM FOR 3D RENDERED GRAPHICS

FIELD OF THE INVENTION

This invention relates to the generation of 3D computer graphics images and describes improvements to techniques described in our British patent 2343603, and earlier related patent, GB2298111.

BACKGROUND OF THE INVENTION

In these systems, the 2D image plane is subdivided into preferably rectangular regions of pixels and, for each such region, a list of the objects that are 'of interest' to that region is compiled. These regions will be referred to as tiles. When the list for a particular tile contains all such objects, the tile can be rendered entirely. An alternative scheme, (as described in our patent application PCT/GB01/02536), allows for partial rendering whereby the list may simply contain a subset of the required objects.

It is important to have cost-effective means of determining which primitives, typically triangles and line segments, should be placed in which tiles. An example is given in FIG. 1. This shows the virtual image plane (e.g. framebuffer) '1', consisting of a collection of pixels, '2'. These pixels are grouped by tiles, '3'. An example primitive '4', a triangle, is shown. This would then need to be placed or referenced by at least the lists for the shaded tiles, 5. Note that it is permissible to include the primitive in additional tile lists, e.g. such as for tile '6', but it would be incorrect to leave it out any of the shaded tiles.

The process of determining which primitives belong in which tiles is called 'binning' or 'tiling'.

Modern 3D computer games tend to have very high polygon counts and thus a high number of primitives. During the generation of the scene, many of the primitives become too small to be sampled and thus do not affect the image. This happens as the objects which they are used to represent recede into the distance. Storing these very small primitives in tile lists is an unnecessary use of time, memory, and processing effort. In FIG. 7, a simple example of a small triangle primitive, '53', is shown against a grid of image pixels, '50'. Typically, pixels, for example '51', are sampled at one point, say the top left corner, '52'. The triangle, '53' fails to cross any of the sample locations and so will not affect the image. In this particular example, this fact can be trivially determined by considering the primitive's bounding box, '54'. Because this does not contain any 'integer' sampling locations, the primitive is redundant.

In FIGS. 8 and 9, other small triangles that miss all the sampling points are shown. In these cases, however, a bounding box rejection test will fail to cull these primitives. One naïve cost-saving approach might be to compute the area of the primitive and, if it is small, reject the surface. Unfortunately, this does not always work as an object may have been modelled by, say, by tessellation to small triangles—rejecting all small triangles could easily make the entire object disappear!

In 3D computer graphics, it is common for triangular/convex polygonal primitives to be defined with an associated 'winding order' which is typically one of {Both, Clockwise, Anticlockwise}. The winding order is used as a performance optimization to eliminate some primitives prior to rendering. This optimization functions such that if, after projection, the primitive has an order of vertices that does not match its specified winding order, that primitive can be ignored.

In the IEEE 754 standard, floating point numbers are represented using a sign bit value, sign, an exponent value, ex, and an 'M' bit mantissa value, m, which with the exception of some minor special cases which can be ignored, represents a value equal to $$(-1)^{sign} \cdot 2^{ex} \cdot \left(1 + \frac{m}{2^M}\right),$$

where $0 \leq m < 2^M$. For 32-bit IEEE floating point numbers, M is 23, but reduced precision maths could use fewer bits. If a system were converting a normalized IEEE float, x, to a system that uses M bits for the mantissa, then it can be shown that the error in the approximated x value, $$x_M,$$

obeys the inequality . . .

$$err\left(x_M\right) \leq \frac{1}{2^{M+1}} |x| \quad \text{eqn 1}$$

Similar expressions for addition and multiplication operations can be derived:

$$err\left(x_M + y_M\right) \leq err\left(x_M\right) + err\left(y_M\right) \quad \text{eqn 2}$$

$$err\left(x_M \cdot y_M\right) \leq err\left(x_M\right)|y| + err\left(y_M\right)|x| + err\left(x_M\right)err\left(y_M\right) \quad \text{eqn 3}$$

In GB2343603, a method of determining which primitives (i.e. the basic rendering components used to represent objects) are in a particular tile is presented. For each primitive (in particular, a triangle) it first determines a bounding box of candidate tiles and then attempts to eliminate a candidate tile by testing each of the edge equations against certain corner points of that tile. For each edge, only one corner of each tile needs to be tested. If the candidate is not eliminated, then the primitive is added to the tile's list.

There are several inconvenient aspects with the approach described in that patent:

(1) The precision of the mathematics used to perform the rejection calculations must be at least as accurate as, or at least give identical results to, that used by the rendering system when that decides which pixels a primitive covers.

An example of a potential problem is shown in FIG. 2. A 2×2 subset of the image's tiles, '7', consisting of a number of pixels, 8, is shown along with a boundary edge of a primitive, '9'. Those pixels, shown in grey, represent the pixels that may be deemed to be 'inside' the primitive by the renderer. Obviously, any tile that contains such a pixel, even if there is only one such pixel, e.g. '10', should also have the primitive included in its list.

This may seem like a triviality, but in practice it may be more complicated. For example, floating point arithmetic may be used to perform the various inside/outside tests, and when rendering a particular tile, the coordinate system may be re-aligned so that rather than using a pixel origin that is at the top left of the image, the rendering may use a local origin, say, at the top left of the tile. Doing this reduces the cost of the hardware needed when rendering inside the tile, however, it would make it very difficult and/or more expensive to have a 'global test' with exactly the same accuracy that can be used for the 'tiling' operation. If there is any deviation in accuracy, then there is a chance that tile '11' might be deemed to not include the primitive and hence cause pixel '10' to be rendered incorrectly.

Even if the mathematics provides exactly the same results as that used inside the renderer, a hardware solution would require a significant amount of silicon.

An alternative could be to use fixed-point mathematics, rather than floating-point, but this incurs the problem that arbitrary polygons would have to be 'clipped' to the valid supported mathematical range. Clipping is an expensive operation which is preferable to avoid.

(2) The 'test corner' of the tile varies depending on the parameters of the particular edge's line/plane equation. This is an inconvenience, as it requires decisions on a tile-by-tile/edge-by-edge basis.

(3) The system only supported triangles and it is useful to also apply the 'tiling' process to other primitive types such as 'thick lines' constructed from parallelograms. Of course, it is trivial to either convert a parallelogram to a pair of triangles, or even extend the method to support any convex polygon, but for the case of lines a more efficient approach is desirable.

(4) The system does not attempt to address cases where 'tiny' primitives, e.g. those that are around the size of a pixel, are supplied to the tiling engine but don't actually get rendered. Many such primitives, such as those illustrated in FIGS. 6 thru 8 simply will not affect the outcome of the final image because they fall between the 'sampling points' used in the renderer. Adding these to the tile list is thus wasted effort.

SUMMARY OF THE INVENTION

Preferred embodiments of the invention presents a method of handling not only the simple case shown in FIG. 6, but also those that arise in FIGS. 7 and 8.

We have appreciated that although it is desirable to add each (convex polygon) primitive to the minimum set of tile lists, it may be expensive to compute this minimal set and that it is certainly safe to occasionally add extra unneeded tiles, such as '6' shown in FIG. 1. It thus becomes apparent that lower precision maths, i.e. cheaper to implement, could be used provided that, if it erred, it always did so in favour of including additional tiles. More precisely, the set of tiles computed by a lower precision approach must be a superset of the correct set of tiles.

As a first embodiment of the invention, a method and an apparatus are presented which safely use lower precision calculations. Furthermore, the system may be tuned to trade-off accuracy, i.e. implementation cost, of the maths against the increased likelihood of additional redundant tiles. The system also has the advantage of using a uniform testing procedure for all edges/tiles.

In a second embodiment of the invention, we have also appreciated that a method of directly tiling line segment primitives that takes advantage of special properties, is desirable. The method presented is cheaper than converting the primitive to an equivalent polygon or polygons.

In a third embodiment, the invention provides a means of rejecting certain 'small' primitives that are guaranteed not to influence the image.

BRIEF DESCRIPTION OF THE DRAWINGS

Preferred embodiments of the invention will now be described in detail by way of examples with reference to the accompanying drawings in which.

DETAILED DESCRIPTION OF PREFERRED EMBODIMENTS

Figure 1:
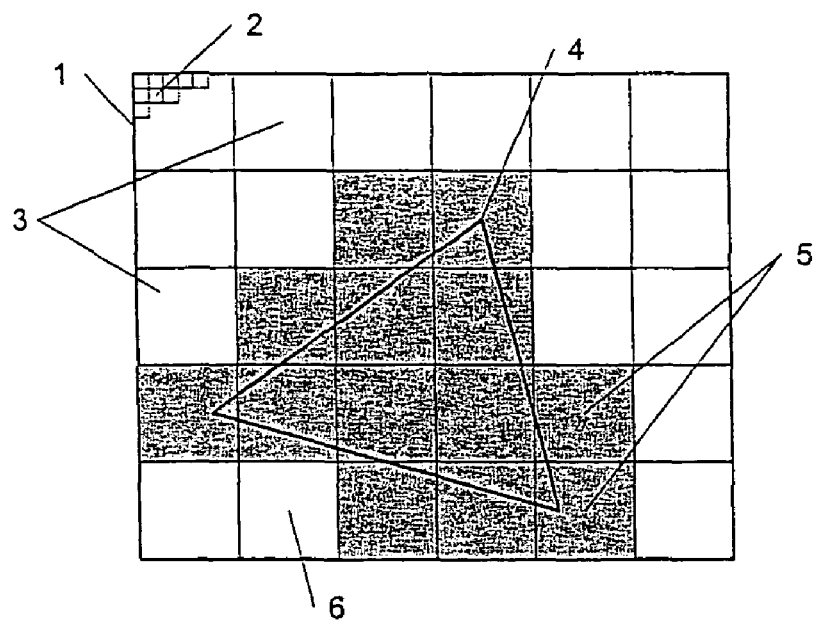
FIG. 1 shows a triangular primitive projected onto an image plane and illustrates the minimal set of tiles which are affected by the primitive.
Figure 2:
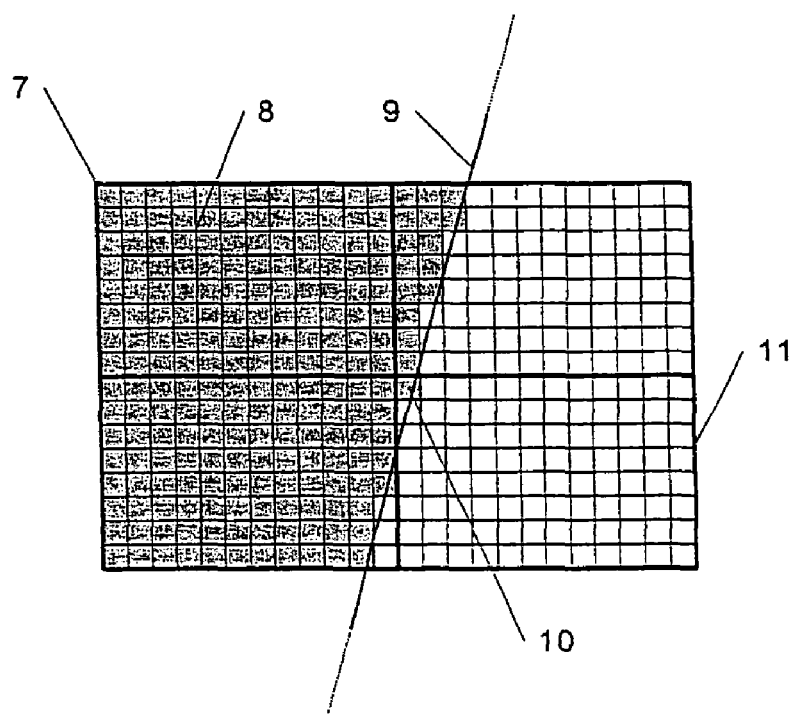
FIG. 2 shows a 'close up' of a region of four tiles and a primitive edge in which one tile contains only a single pixel that is affected by the primitive.
Figure 3:
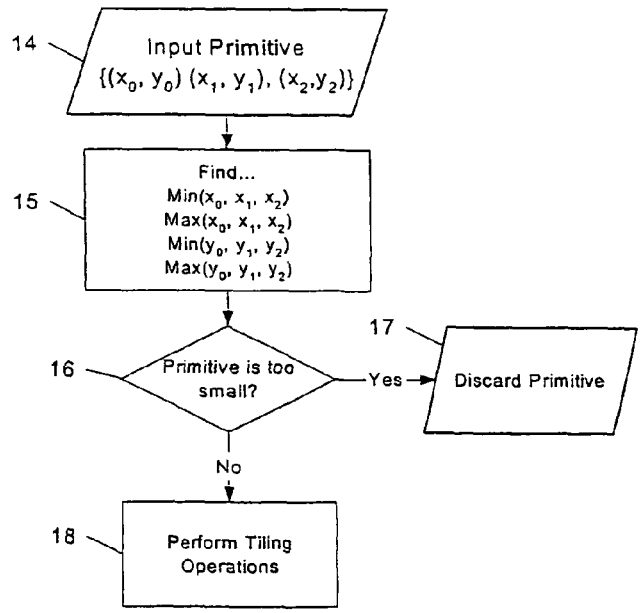
FIG. 3 shows an overview of the steps performed when determining if and how to 'tile' a primitive using the invention.

A preferred embodiment of the invention will be presented with reference to FIG. 3. As a first step, a primitive, which is preferably a triangle, is input, '14'.

The triangle has vertices, $\{(x_0,y_0),(x_1,y_1),(x_2,y_2)\}$, which are specified using IEEE, 32-bit, floating-point coordinates. As with GB2343603, the bounding box of the primitive is identified by computing the maximums and the minimums of both the projected X and Y coordinates values, '15', i.e.

$p_{xmin} = \min(x_0, x_1, x_2)$ $p_{xmax} = \max(x_0, x_1, x_2)$ $p_{ymin} = \min(y_0, y_1, y_2)$ $p_{ymax} = \max(y_0, y_1, y_2)$ These maximums and minimums are determined at full accuracy as this is a relatively cheap operation. As an optimization, it is also possible to test for equality of the vertex positions and reject those triangles that have repeated vertex positions, as these have exactly zero area and will not contribute to the image. At this point, the invention can also reject any primitives that are trivially completely 'off-screen'.

Using the computed bounding box and primitive's coordinates, small primitive culling tests are performed, '16', details of which are given later. If the primitive is not deemed to affect the image, it is discarded, '17', otherwise it is 'tiled', i.e. placed into the relevant tile lists, '18'. The details of the tiling process for the triangle primitive, '18', will now be presented along with extensions to process wide lines. The small object culling, '16' is presented after that.

Our British patent No. 2343603 describes how the edges of a (convex polygonal) primitive can be represented as lines (or plane equations) of the form . . .

$$Ax+By+C=0$$

. . . where A, B, and C are coefficients that depend on the position and orientation of the particular edge and x and y are pixel coordinates. A point, (x,y), in the image plane is defined as being strictly inside a 'clockwise' primitive when . . .

$$A_i x + B_i y + C_i > 0$$

. . . for all edges, i. Under certain circumstances (e.g. the fill rules described in the computer graphics standard, OpenGL), some edges are also included as being inside the primitive. For the purposes of tiling, where the system can afford to be conservative, all edges can be considered to be part of the primitive and so the inside test for a 'clockwise' primitive is relaxed to:

$$\forall i, A_i x + B_i y + C_i \geq 0$$

'Anticlockwise' primitives should use a test. For brevity, the document will only describe the clockwise case, as the extension to the other cases will be obvious to one skilled in the art.

For a projected triangle, GB 2343603 also gives the equations for computing the coefficients for the edge test, i.e., if $(x_i,y_i)$ and $(x_{i+1},y_{i+1})$ are the end points of an edge, i, then $$A_i = y_i - y_{i+1}$$

$$B_i = x_{i+1} - x_i$$

$$C_i = x_i y_{i+1} - x_{i+1} y_i$$

These equations are actually derived from the adjoint of a 3×3 matrix that contains just the projected coordinates of the triangle vertices. In some situations it is preferable to calculate the (projected) edges of the triangle without having to project the vertices, i.e. using the homogeneous coordinates. In that situation, the edge equations can also be computed using the corresponding adjoint matrix and, in an alternative embodiment, the tiling operation can be performed using homogeneous coordinates. For brevity, that alternative embodiment will not be presented, but the adaptation will be clear to one skilled in the art.

Figure 4:
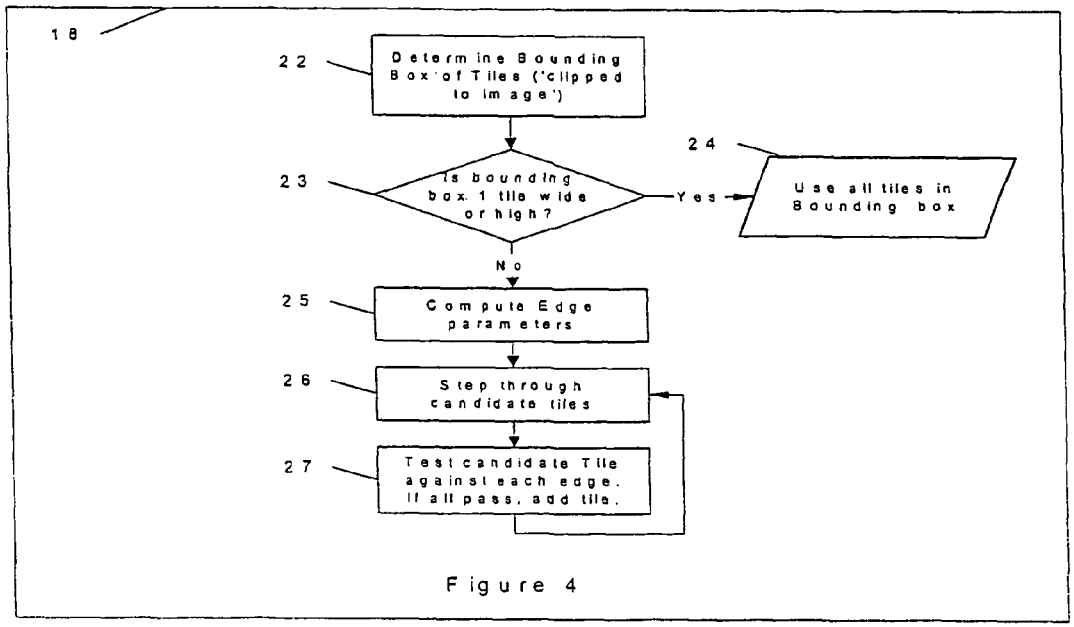
FIG. 4 shows the steps performed for the tiling of a primitive that has not been rejected due to tiling.

The overview of the processing steps contained in '18' in the preferred embodiment is now presented with reference to FIG. 4.

An initial rectangular region of candidate tiles, limited to the extent of the image plane, is then determined from the extremities, '22' of the primitive.

As an optimization in the preferred embodiment, when the set of candidate tiles is only a single tile high and/or a single tile wide, '23', the bounding box can be used directly as all tiles will be required, '24'.

The next step is to compute the parameters, '25' of the edge equations. This processing step differs from that of the earlier systems and will be described in more detail shortly.

The process continues by iterating through the candidate set of tiles, '26', testing each candidate against each of the edges, '27'. Only if all edge tests 'pass', the primitive is included in that tile's list. The edge test employed in the invention is also simpler than that presented in GB2343603. In an alternative embodiment, the system could use an alternative order to process the candidate tiles, such as a binary chop, which would eliminate some tiles based on the results of their neighbors.

Figure 5:
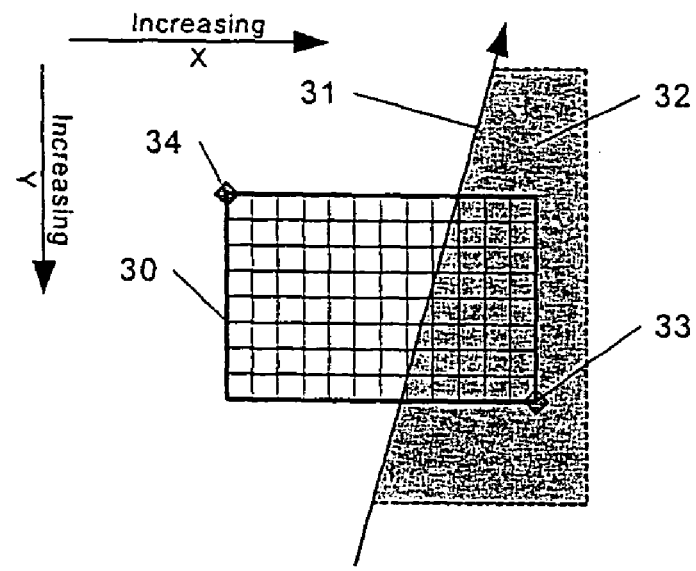
FIG. 5 shows a tile partially covered by a primitive with a 'safe' test point for the edge, as described in the prior art of GB2343603, and the preferred sampling location for an embodiment of the invention.

To understand the edge equation calculations performed in '25', references will now be made to FIG. 5. For a given candidate tile, '30', we must consider each of the edges of the primitive. In this example, an edge, '31' crosses the tile. The shaded region, '32', represents part of the area inside the primitive. As discussed in GB2343603, although performing an inside test at corner '33' for this particular edge will produce the correct result for this particular edge, it is inconvenient to have to select the sample point on an edge-by-edge basis. Instead, it is preferable to use a uniform sampling location. In the preferred embodiment, this is chosen to be the top left corner '34'. The actual edge equations are adjusted slightly to allow this to be done.

Each edge is computed independently and this is now described. We define the end points (in order of definition) of edge 'i', in original full floating-point precision, to be $(x_i^f, y_i^f)$ and $(x_j^f, y_j^f)$ where $0 \leq i \leq 2$ and $j=(i+1)\mod 3$. Two comparisons of these data values, $x_j^f \geq x_i^f$ and $y_j^f \geq y_i^f$, are performed and are used as described in the following pseudo code. This pseudo code can be implemented by those skilled in the art in either hardware or software.

OrientationTypes={TopLeft, TopRight, BottomLeft, BottomRight};
OrientationTypes Mode;
BOOL XjGTE, YjGTE;
// Compare the coordinate values
XjGTE:=(xj>=xi);
yjGTE:=(yj>=yi);
// Determine edge orientation . . .
IF (XjGTE AND NOT YjGTE)
{
   Mode:=TopLeft;
}
ELSE IF (XjGTE AND YjGTE)
{
   Mode:=TopRight;
}
ELSE IF (NOT XjGTE AND YjGTE)
{
   Mode:=BottomRight;
}
ELSE
{
   Mode:=BottomLeft;
}

The orientation of the edge determines the adjustments made to the edge equations. This involves computing 'shift' amounts as described in the following pseudo-code; the $T_x$ and $T_y$ values represent the dimensions of a tile in the x and the y directions respectively.

IF ((Mode==ToTopLeft) OR (Mode==ToBottomLeft))
{
   x_shift=Tx;
}
ELSE
{
   x_shift=0;
}
IF ((Mode==ToTopLeft) OR (Mode==ToTopRight))
{
   y_shift=Ty;
}
ELSE
{
   y_shift=0;
}

The logic behind this shift amount is that, rather than moving test point as a function of the edge, each edge will be shifted so that the same test corner can be used for all the edges. It will shortly become apparent to one skilled in the art that it is preferable to choose tile dimensions which are exact powers of two in size, for example, 32×16, as this will result in lower cost implementations.

This shift value is used to compute a new $C_i$ coefficient for the edge based on the equation $C'_i = x_1 y_2 - x_2 y_1 + x_{shift} \cdot A_i + y_{shift} \cdot B_i$. This equation, however, cannot be used directly unless full precision mathematics is employed. Instead we use a 'safe' calculation that can be done with reduced precision.

Floating-point mathematics is used with a small number of mantissa bits, M. This will typically be between 8 and 22 bits, with the preferred embodiment using 16 bits.

From inequalities 1, 2, and 3, above, it is apparent that the errors in the floating-point numbers are bounded by their magnitudes. Using these magnitudes directly is inconvenient and so the embodiment simplifies the tests by relaxing the error bounds further. Therefore, as a first step to computing a 'safe' edge equation, the following values, $xmag_i$ and $ymag_i$, are computed from the end points such that the following inequalities are obeyed:

$$2^{xmag} \geq \max(|x_j|, |x_i|, T_x) > 2^{xmag-1}$$

$$2^{ymag} \geq \max(|y_j|, |y_i|, T_y) \geq 2^{ymag-1}$$

It should be apparent to one skilled in the art, that this is a simple operation when applied to floating point numbers.

From these values and the application of the equations 1, 2, and 3, a 'safety margin' value, fslop, is computed thus:

$$fslop_i = 13 * 2^{xmag+ymag-(M+1)}$$

Again, this is a simple operation in the floating point involving a 'constant' mantissa value (derived from the '13') and some simple integer mathematics to derive the floating-point exponent.

Using the reduced precision mathematics, the edge equation coefficients are calculated as follows:

$$a_{i_M} = y_{i_M} - y_{j_M}$$

$$b_{i_M} = x_{j_M} - y_{i_M}$$

$$c_{i_M} = x_{i_M} y_{j_M} - x_{j_M} y_{i_M} + x_{shift} \cdot a_{i_M} + y_{shift} \cdot b_{i_M} + fslop_i$$

(Note, for anticlockwise primitives, the fslop value should be subtracted in the last equation).

Once these values have been computed for each edge, the system can iterate through the set of candidate tiles, '26'.

The inequality test for each edge in each tile, performed in '27', can be done in several ways. One such possibility is . . .

$$a_{i_M} X + b_{i_M} Y + c_{i_M} \geq 0$$

. . . where X and Y are the coordinates of the top left corner of the candidate tile, but the preferred embodiment uses the following . . .

$$b_{i_M} Y + c_{i_M} - a_{i_M} X$$

. . . a floating-point magnitude comparison is slightly less expensive than an addition and (2) since this formulation also allows the left hand side to be held constant while iterating through a row of candidate tiles.

Although floating-point arithmetic has been used in the preferred embodiment, it would also be feasible with some adjustments to employ integer calculations.

Although unit '26' has been described as 'stepping' or 'iterating' through the candidate tiles, in an alternative embodiment, several candidate tiles could be tested simultaneously.

Figure 6:
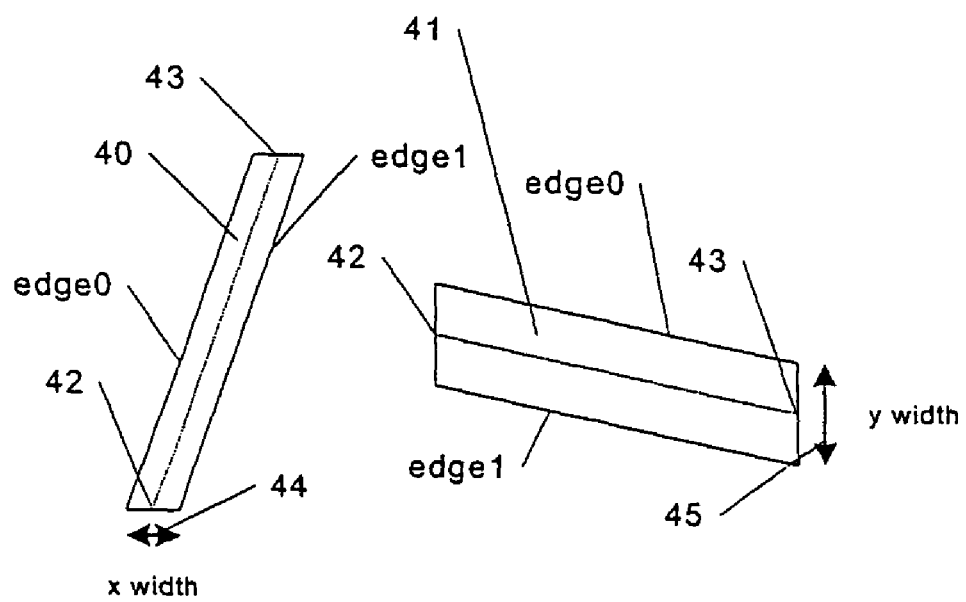
FIG. 6 shows the shape and orientation of preferred line segment primitives.

In an extension to the preferred embodiment, support for wide line segments is also provided, and would re-use many of the facilities provided for the tiling of other triangle/convex primitives. These line segments are preferably of the form shown in FIG. 6, and fall into two classes—those that are predominantly vertical, such as that shown by '40', and those that are predominantly horizontal, such as '41'. They are specified by defining the end points of the central axis, i.e., '42' ($x_0, y_0$), and '43', ($x_1, y_1$). A line segment is chosen to be of the 'mainly vertical' form if $|\Delta_x| < |\Delta_y|$ and 'mainly horizontal' otherwise. The 'vertical' lines segments are capped by a horizontal line of a known width wx, '44', while the 'horizontal' lines are closed by a vertical section of an alternative known width wy, '45'.

As with the triangle primitives, the first step is to compute the bounding box of the candidate tiles. Because the preferred embodiment avoids the use of full accuracy mathematics for cost saving purposes, it is not possible to know with 100% certainty which class a particular line segment falls into. For this reason the bounding box calculation will assume that the line segment could have either horizontal or vertical ends. As before, the system can compute min and max values of the end points cheaply. For the preferred embodiment, a bounding box on the segment is set to be:

$$(x_{bound\,min}, x_{bound\,max}) = \left(\left(\min(x_0, x_1) - \frac{w_x}{2}\right), \left(\max(x_0, x_1) + \frac{w_x}{2}\right)\right)$$

$$(y_{bound\,min}, y_{bound\,max}) = \left(\left(\min(y_0, y_1) - \frac{w_y}{2}\right), \left(\max(y_0, y_1) + \frac{w_y}{2}\right)\right)$$

This then determines the set of the candidate tiles and steps 22, 23, and 24 are applied as before.

For the testing of the edges, the present invention only needs to consider the two edges that are parallel to the central axis, as the end caps have effectively been tested as part of the bounding box. These will be called Edge0 and Edge1. The computation of Edge0's a and b values is done as before:

$$a_{0_M} = y_{0_M} - y_{1_M}$$

$$b_{0_M} = x_{1_M} - x_{0_M}$$

The computation Edge0's C co-efficient, $$c_{0_M}$$

now proceeds as follows: The orientation of the edge is determined as described previously, and then the shift amounts are computed using the following method:

```
IF ((Mode==ToTopLeft) OR (Mode==ToBottomLeft))
{
    x_shift=(Tx+w_x/2);
}
ELSE
{
    x_shift=(-w_x/2);
}
IF ((Mode==ToTopLeft) OR (Mode==ToTopRight))
{
    y_shift=(Ty+w_y/2);
}
ELSE
{
    y_shift=(-w_y/2);
}
```

The remainder of the calculation for $$c_{0 \atop M}$$

is then exactly the same as previously, i.e., . . .

$$c_{i \atop M} = x_{i \atop M} y_{j \atop M} - x_{j \atop M} y_{i \atop M} + x_{shift} \cdot a_{i \atop M} + y_{shift} \cdot b_{i \atop M} + fslop_i$$

. . . where i=0,j=1.

For edge1, the 'a' and 'b' values are simply negatives of Edge0's values, while its c coefficient is computed using the above procedure.

We now describe the steps taken in unit '16' of the preferred embodiment, i.e. the testing for small primitives that can be rejected during tiling because they will not be sampled by the renderer. Although this will be discussed in reference to triangle primitives, this aspect can also be applied to the line segment primitives but, for brevity, this will not be covered here, as its application will be apparent to those skilled in the art. Similarly, the discussion only covers 'clockwise' primitives, as the modifications to support the other 'culling' types are also straightforward. The embodiment uses a pixel sampling point that is located at the top left corner of the pixel. Other possibilities, such as choosing the centre of the pixel, could be achieved by offsetting the primitive.

Figure 10:
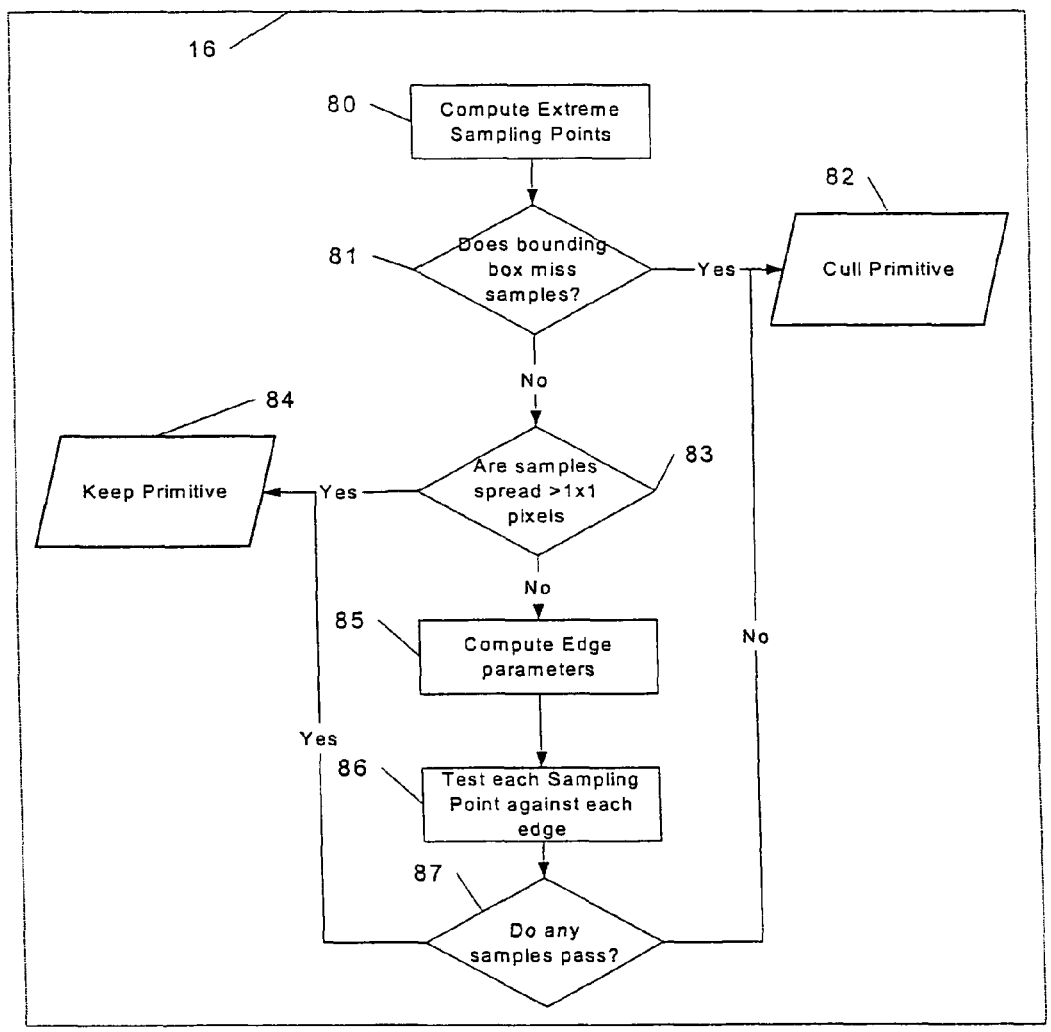
FIG. 10 shows the steps used in testing whether small polygons can be culled.

The processing is described with reference to FIG. 10. Using the maximum and the minimum values of the primitive, as computed in step '21', the system determines a set of 4 pixel sampling locations, $\{S_{00}, S_{01}, S_{10}, S_{11}\}$, '80', as follows . . .

$$s_{xmin} = \lceil p_{xmin} \rceil \quad s_{xmax} = \lfloor p_{xmax} \rfloor$$

$$s_{ymin} = \lceil p_{ymin} \rceil \quad s_{ymax} = \lfloor p_{ymax} \rfloor$$

$$S_{00} = (s_{xmin}, s_{ymin})$$

$$S_{01} = (s_{xmax}, s_{ymin})$$

$$S_{10} = (s_{xmin}, s_{ymax})$$

$$S_{11} = (s_{xmax}, s_{ymax})$$

where $\lfloor x \rfloor$ and $\lceil x \rceil$ are the standard 'floor' and 'ceiling' operators. As examples, in FIG. 7, $S_{00}$ and $S_{10}$ are indicated by '55' and '56' respectively, while in FIG. 9, they are indicated by '73' and '71' respectively. Note that the positions of these appear to swap due to the relative sizes of the bounding boxes and the behavior of 'floor' and 'ceiling'.

Figure 7:
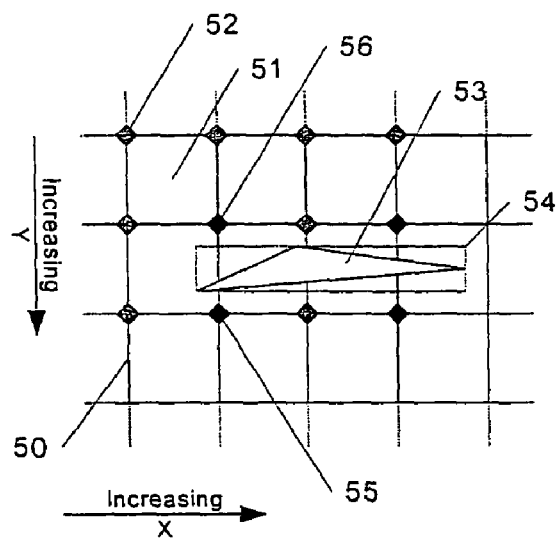
FIG. 7 shows an example of a small primitive that will not be visible if passed to the renderer, but could be rejected or culled using a simple bounding box test.

In step '81', the bounding box of the primitive is tested to see if it misses all sampling points, i.e. testing for trivial cases, an example of which is shown in FIG. 7. If this is the case, the primitive is culled, '82'. The test in '81' can be summarized as:

$$\text{IF}(s_{xmin} > s_{xmax} \text{ OR } s_{ymin} > s_{ymax}) \text{ THEN CULL}$$

Figure 8:
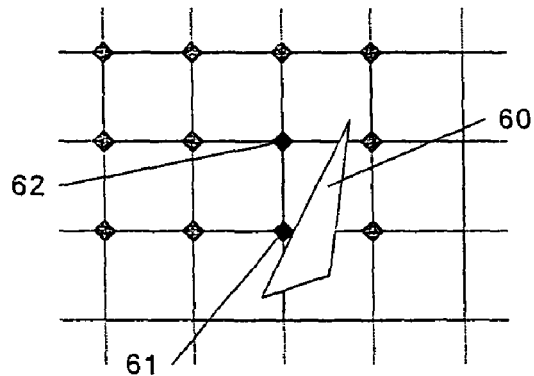
FIGS. 8 and 9 show examples of small primitives that also will not be visible, but cannot be culled simply using bounding boxes.
Figure 9:
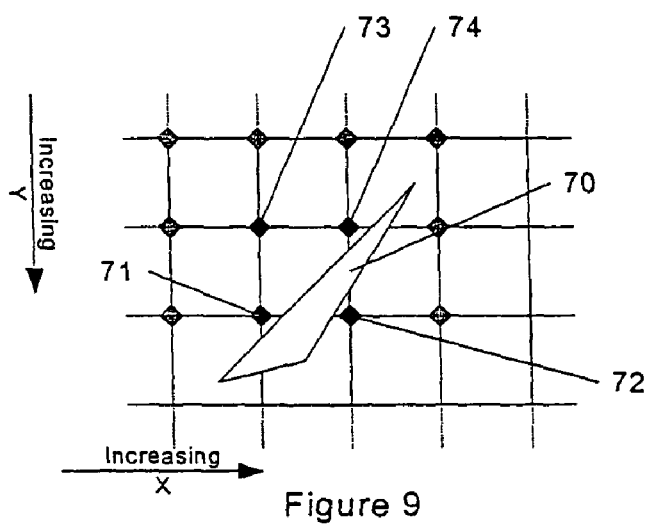

This test, however, will not cull the examples shown in FIGS. 8 and 9.

Because it is not cost effective to consider primitives larger than a certain size, the preferred embodiment limits its small object culling tests to those primitives whose chosen sampling locations are spread out no further than a 1×1 pixel area. Step '83' tests for this condition and if the primitive is deemed to be too large, it is not tested for culling, '84'. The test performed in '83' is:

$$\text{IF}((s_{xmax} - s_{xmin}) > 1) \text{ OR } (s_{ymax} - s_{ymin}) > 1) \text{ THEN KEEP}$$

The invention now tests each of the four sampling points to see if they are inside the primitive: As before, the edge coefficients, '85' are computed using the previously specified edge equations. In this situation, however, because the range of numbers is so small, the calculations can be done in 'high precision' very cheaply using fixed-point mathematics.

Note that there are at most three possible cases to consider: That of only one distinct sampling point, two distinct sampling points (as shown by '61' and '62' in FIG. 8), or four distinct sampling points (as shown by '71', '72', '73', and '74' in FIG. 9).

In the preferred embodiment, up to four sample locations can be tested, '86', against each edge quite cheaply by noting that the four test inequalities for an edge for the situation with the four distinct sampling locations are:

$$A_i S_{xmin} + B_i S_{ymin} + C_i \geq 0$$

$$A_i S_{xmax} + B_i S_{ymin} + C_i \geq 0 \Leftrightarrow A_i(S_{xmin}+1) + B_i S_{ymin} + C_i \geq 0 \Leftrightarrow A_i S_{xmin} + B_i S_{ymin} + C_i \geq -A_i$$

$$A_i S_{xmin} + B_i S_{ymax} + C_i \geq 0 \Leftrightarrow A_i S_{xmin} + B_i S_{ymin} + C_i \geq -B_i$$

$$A_i S_{xmax} + B_i S_{ymax} + C_i \geq 0 \Leftrightarrow A_i S_{xmin} + B_i S_{ymin} + C_i \geq -B_i - A_i$$

As can be seen, the same basic calculation is reused, i.e. $A_i S_{xmin} + B_i S_{ymin} + C_i$ and then compares it to the four values, $\{0, -A_i, -B_i, (-A_i - B_i)\}$. Since the worst case requires four sampling points and since sampling outside the primitive does no harm, the embodiment, for simplicity, tests all of the above conditions regardless of the number of genuinely interesting sampling points.

A sample point is deemed to be outside the primitive if any of the edges fails its test. In step '87', if all of the sample locations are outside the primitive, then the primitive is culled, in step '82', otherwise it is kept, in step '84'.

In an alternative embodiment, a larger than 2×2 sampling grid could be used.

The invention claimed is:

1. A method for culling small objects in a system for shading 3-dimensional computer graphics images comprising the steps of:
  subdividing a display on which an image is to be viewed into a plurality of rectangular areas;

for each rectangular area deriving a list of objects in the image which may be visible in that rectangular area;
using the list of objects to determine how the rectangular area should be shaded for display;
characterized in that the step of deriving a list of objects comprises the step of;
determining maximum and minimum values for each object in x and y directions;
for each object in the image, determining a bounding box from the maximum and minimum values of the x and y coordinates of the object;
determining a set of pixel sampling points from the maximum and minimum values;
determining whether or not a bounding box surrounding the object covers any of the pixel sampling points;
culling the object if the bounding box misses all the pixel sampling points;
testing each sampling point against each edge of the object;
determining from the test performed whether or not the object covers any pixel sampling point; and
adding or rejecting the object from the list in dependence on the result of the determination.

2. A method according to claim 1, including the step of determining whether or not the sampling points are spread by more than 1×1 pixel and not testing the object for culling if the sampling points exceed this limit.

3. A method according to claim 1, including the step of, for each object, selecting only those rectangular areas which fall at least partially within the object's bounding box when determining whether or not that object is to be added to the list for a rectangular area.

4. An apparatus for culling small objects in a system for shading a three-dimensional computer graphics image comprising:
a display;
means for subdividing the display on which the image is to be viewed into a plurality of rectangular areas;
means for deriving for each rectangular area a list of objects in the image which may be visible in that rectangular area;
means for determining how the rectangular area should be shaded for display by using the list of objects;
characterized in that the means for deriving a list of object comprises;
means for determining maximum and minimum values for each object in x and y directions;
for each object in the image determining a bounding box from the maximum and minimum values in the x and y directions;
means for determining a set of pixel sampling points from the maximum and minimum values;
means for determining whether or not the bounding box surrounding the object covers any of the pixel sampling points; and
means for culling the object if it misses all the pixel sampling points;
means for testing each pixel sampling point against each edge of the object;
means for determining from the test performed by the testing means whether or not the object covers any sampling points; and
means for adding or rejecting the object from the list in dependence on the result of the determination.

5. An apparatus according to claim 4, including means for determining whether or not the sampling points are spread by more than 1×1 pixel in the x and y directions and not testing the object for culling if the sampling points exceed this limit.

6. An apparatus according to claim 4, including means for selecting for each object only those rectangular areas which fall at least partially within the bounding box of the object when determining whether or not that object is to be added to the list for a rectangular area.

* * * * *